(12) United States Patent  
Hosoi

(10) Patent No.: US 6,707,050 B2  
(45) Date of Patent: Mar. 16, 2004

(54) RADIATION IMAGE STORAGE PANEL

(75) Inventor: Yuichi Hosoi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/052,393

(22) Filed: Jan. 23, 2002

(65) Prior Publication Data

US 2002/0139937 A1 Oct. 3, 2002

(30) Foreign Application Priority Data

Jan. 24, 2001 (JP) ........................ 2001-015618

(51) Int. Cl.⁷ .............................................. G03B 42/08

(52) U.S. Cl. ................................................ 250/484.4

(58) Field of Search ...................................... 250/484.4

(56) References Cited

U.S. PATENT DOCUMENTS

| | | | | |
|---|---|---|---|---|
| 4,845,369 A | * | 7/1989 | Arakawa et al. | 250/484.4 |
| 4,879,202 A | * | 11/1989 | Hosoi et al. | 250/484.4 |
| 5,055,681 A | * | 10/1991 | Tsuchino et al. | 250/484.4 |
| 5,151,604 A | * | 9/1992 | Kohda et al. | 250/484.4 |
| 2002/0104974 A1 | * | 8/2002 | Hosoi | 250/484.4 |
| 2003/0075688 A1 | * | 4/2003 | Fukui | 250/484.4 |
| 2003/0186023 A1 | * | 10/2003 | Isoda et al. | 250/484.4 |

* cited by examiner

Primary Examiner—Christopher W. Fulton  
Assistant Examiner—Madeline Gonzalez  
(74) Attorney, Agent, or Firm—Sughrue Mion, PLLC

(57) ABSTRACT

A radiation image storage panel composed of a phosphor film which has cracks extending in its depth direction and is formed by vapor-accumulating method shows particularly good image-forming characteristics having a good balance between its sensitivity and its image sharpness when the phosphor film has a thickness of 300 to 700 µm and has a relative density of 85 to 97%.

4 Claims, 1 Drawing Sheet

RADIATION IMAGE STORAGE PANEL

FIELD OF THE INVENTION

The present invention relates to a radiation image storage panel favorably employable in a radiation image recording and reproducing method utilizing stimulated emission.

BACKGROUND OF THE INVENTION

When a stimulable phosphor is exposed to a radiation such as X-ray, it absorbs and stores a portion of the radiation energy. The stimulable phosphor then emits stimulated emission according to the level of the stored energy when the phosphor is exposed to an electromagnetic wave such as visible light or infrared rays (i.e., stimulating light).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light such as a laser beam to emit a stimulated emission; and photoelectrically detecting the emitted light to obtain electric signals. The storage panel thus treated is subjected to a step for erasing radiation energy remaining therein, and then stored for the use in the next recording and reproducing procedure. Thus, the radiation image storage panel can be repeatedly used.

In U.S. patent application Ser. No. 09/749,623, a modified radiation image recording and reproducing method is described. In the method, a function for absorbing radiation and a function for storing the radiation energy are separated, while a stimulable phosphor used in the known radiation image recording and reproducing method performs both functions. For that purpose, a radiation image storage panel comprising at least a stimulable phosphor (for storage) and a fluorescent screen comprising a fluorescent phosphor which absorbs radiation and emits ultraviolet or visible light are used in combination. The method comprises the steps of exposing the fluorescent screen to a radiation having passed through an object or having radiated from an object and converting the radiation into ultraviolet or visible light by the fluorescent phosphor; having the ultraviolet or visible light absorbed by the stimulable phosphor; sequentially scanning a stimulating ray on the stimulable phosphor of the storage panel to emit a stimulated emission; and photoelectrically detecting the emitted light to obtain electric signals of the radiation image.

The radiation image storage panel (often referred to as stimulable phosphor sheet) has a basic structure comprising a support and a stimulable phosphor layer provided thereon. The support may be omitted, if the phosphor layer is self-supporting. On the free surface (surface not facing the support) of the phosphor layer, a protective film is generally placed to keep the phosphor layer from chemical deterioration or physical damage.

The phosphor layer is generally formed by coating a dispersion of phosphor particles in a binder solution on the support and drying the coated dispersion on the support, and therefore comprises a binder and phosphor particles dispersed therein. The binder can be removed by firing the coated phosphor layer to increase a relative density of the phosphor in the phosphor layer.

It is known that the phosphor layer can be also prepared by vapor-accumulating method such as vapor deposition or sputtering.

It is desired that radiation image storage panels used in these methods have sensitivity as high as possible and to provide an image of as high quality (e.g., high sharpness, high graininess) as possible.

Japanese Patent Provisional Publication No. 63-19600 describes a radiation image storage panel having a phosphor layer (film) which is prepared by firing a coated phosphor layer composed of phosphor particles and a binder to have a relative density of 70% or more. The phosphor film generally has a thickness in the range of 20 $\mu$m to 1 mm, preferably 50 to 500 $\mu$m. In the working examples, phosphor films having a thickness of 200 $\mu$m and a relative density of 75 to 93% are prepared.

Japanese Patent Provisional Publication No. 62-39800 describes a radiation image storage panel having a stimulable phosphor film which has cracks extending in its depth direction and is formed by vapor-accumulating method, wherein the phosphor film has a void volume of 3 to 30%. The phosphor film preferably has a thickness in the range of 10 to 800 $\mu$m, preferably 50 to 500 $\mu$m. In the working examples, phosphor films of RbBr:0.004Tl having a thickness of 250 $\mu$m are described.

Japanese Patent Provisional Publication No. H2-58000 describes a radiation image storage panel having a stimulable phosphor film which is produced by vapor-accumulating to form prismatic crystals on a support at a certain angle to the normal direction of the support.

SUMMARY OF THE INVENTION

The present invention has an object to provide a radiation image storage panel which has a high sensitivity and which gives a reproduced radiation image having a high sharpness such as MTF of approx. 60% or more (1 c/mm) and MTF of approx. 30% or more (2 c/mm). The radiation image storage panel having such characteristics is very appropriate in the use for medical diagnosis.

As a result of the study performed by the present inventor, it has been discovered that the phosphor film (or layer) formed by vapor-accumulating method should have a very narrow thickness range and a very narrow relative density range, if the phosphor film is directed to the use for medical diagnosis which requires a high sensitivity and a high image sharpness.

The present invention resides in a radiation image storage panel comprising a phosphor film which has cracks extending in a depth direction thereof and is formed by vapor-accumulating method, wherein the phosphor film has a thickness in the range of 300 to 700 $\mu$m, preferably 400 to 600 $\mu$m, and has a relative density in the range of 85 to 97%, preferably 85 to 95%.

In the radiation image storage panel of the invention, the phosphor film preferably comprises a stimulable alkali metal halide phosphor, specifically a cesium halide phosphor.

DETAILED DESCRIPTION OF THE INVENTION

Figure 1:
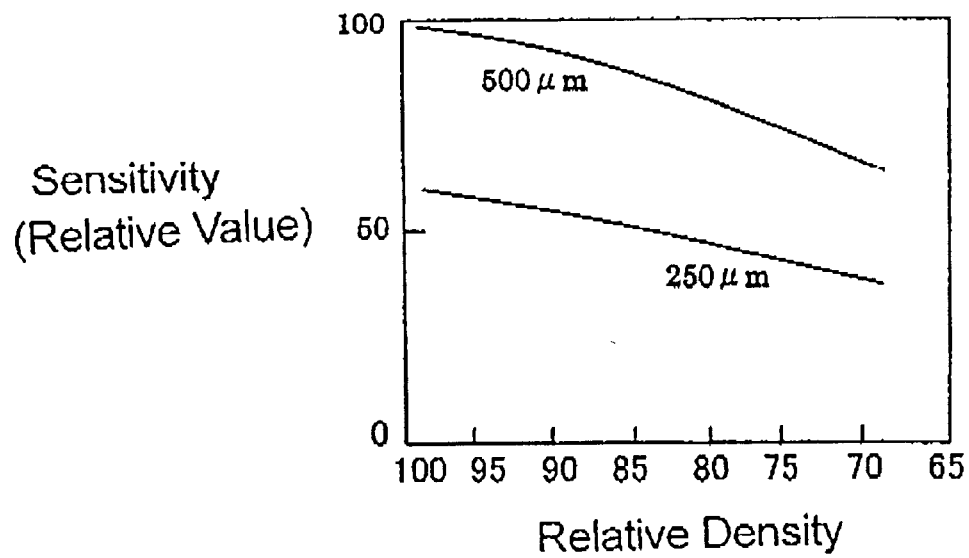
FIG. 1 indicates relationships between relative density values of phosphor layers produced by vapor-accumulation and sensitivity values provided by the radiation image storage panels having the phosphor layer.

The process for preparing the radiation image storage panel of the invention is described below by referring to the case where the phosphor is a stimulable phosphor.

The support employed in the invention can be optionally selected from those employed in the conventional radiation image storage panels. If the support is used as a substrate for forming the phosphor layer thereon by vapor accumulation, preferred supports are sheets of quartz glass, metals (e.g., aluminum, iron, tin, chromium) and resins (e.g., aramide). It is known that, for improving sensitivity or image quality (sharpness, graininess), a conventional radiation image storage panel may have a light-reflecting layer containing light-reflecting material such as titanium dioxide and/or a light-absorbing layer containing light-absorbing material such as carbon black. In the radiation image storage panel of the invention, these layers can be optionally provided. Further, for improving the sharpness of the resultant image, fine hollows or warts may be formed on the phosphor layer-side surface of the support (or on the phosphor layer-side surface of the auxiliary layer such as an undercoating layer, the light-reflecting layer or the light-absorbing layer, if it is provided).

On the support, the phosphor layer is formed by vapor accumulating method.

As the phosphor, a stimulable phosphor giving a stimulated emission in the wavelength region of 300 to 500 nm when it is irradiated with stimulating light in the wavelength region of 400 to 900 nm is preferably employed.

A particularly preferred stimulable phosphor is an alkali metal halide phosphor having the following formula(I):

$$M^{I}X \cdot aM^{II}X'_2 \cdot bM^{III}X''_3 : zA \qquad (I)$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; A is at least one rare earth element or metal element selected from the group consisting of Y, Ce, Pr, Nd, Om, Eu, Gd, Tb, Dy, Ho, Er, Tm, Yb, Lu, Na, Mg, Cu, Ag, Tl and Bi; each of X, X' and X'' independently is at least one halogen selected from the group consisting of F, Cl, Br and I; and a, b and z are numbers satisfying the conditions of $0 \leq a < 0.5$, $0 \leq b < 0.5$ and $0 \leq z < 0.2$, respectively.

In the formula (I), at least Cs is preferably included as $M^I$, at least Br is preferably included as X, and A is particularly preferably Eu or Bi. The phosphor of the formula (I) way contain a metal oxide (such as aluminum oxide, silicon dioxide or zirconium oxide) as an additive in an amount of not more than 0.5 mol based on 1 mol of $M^I$.

The phosphor used in the invention is not restricted to the stimulable phosphor. A phosphor giving a spontaneous emission in the ultraviolet or visible wavelength region when it absorbs a radiation such as X-ray can be also employed in the invention. Examples of these phosphors include LnTaO$_4$:(Nb,Gd), Ln$_2$SiO$_5$:Ce, LnOX:Tm (where Ln is a rare earth element), CsX (where X is a halogen), Gd$_2$O$_2$S:Tb, Gd$_2$O$_2$S:Pr,Ce, ZnWO$_4$, LuAlO$_3$:Ce, Gd$_3$Ga$_5$O$_{12}$:Cr, Ce and HfO$_2$.

In the present invention, the phosphor layer can be formed by electron beam-evaporating method, which belongs to the vapor accumulation method. The electron beam-evaporating method gives regularly aligned prismatic crystals having good shape. Further, since the vapor source is locally heated and instantly vaporized, the composition of the resultant phosphor in the layer is usually almost the same as that of the phosphor of the vapor source. In contrast, in other vapor accumulation methods, since a component having a high vapor pressure is preferentially vaporized (for example, an activator is vaporized prior to the phosphor matrix components), the composition of the resultant phosphor may be not coincident with that of the phosphor of the vapor source.

In the first place, a stimulable phosphor of vapor source and a substrate on which the vapor is to be deposited are set in an vapor-deposition apparatus. The apparatus is then evacuated to give a pressure of $3 \times 10^{-10}$ to $3 \times 10^{-12}$ kg/cm$^2$. The substrate is placed perpendicularly to the direction in which the vapor comes out of the source. Inert gases such as Ar and Ne may be introduced into the apparatus while the vacuum is kept in the above range.

The stimulable phosphor is preferably compressed to form a pellet. The pressure of compressing is generally in the range of 800 to 1,000 kg/cm$^2$. The phosphor may be heated in the range of 50 to 200° C. during the compressing procedure, and after the compression is complete, the obtained pellet may be degassed. By the compressing process, the relative density of the vapor source can be increased. If the vapor source has a low relative density, the phosphor is often so non-uniformly vaporized that the deposited film may have an uneven thickness, that bumped substances deposit on the substrate or that the activators or additives of the phosphor are segregated in the deposited film. In place of the stimulable phosphor, a mixture of starting materials for the formation of the stimulable phosphor can be used as the vapor source.

In the second place, an electron beam generated by an electron gun is applied onto the vapor source. The accelerating voltage of electron beam is preferably in the range of 1.5 kV to 5.0 kV. If it is lower than 1.5 kV, the voltage is so unstable at the beam position drifts. Further, since the surface of vapor source scanned by the electron beam is deformed, the vaporizing surface can not be kept flat. It the accelerating voltage is higher than 5.0 kV, the prismatic phosphor crystals grow unevenly in a gas phase by vaporization.

By applying the electron beam, the stimulable phosphor of vapor source is heated, scattered and deposited on the substrate. The deposition rate of the phosphor is generally in the range of 0.1 to 1,000 μm/min., preferably in the range of 1 to 100 μm/min. The electron beam may be applied twice or more to form two or more phosphor layers. Further, two or more phosphors may be co-deposited by means of plural electron guns. It is also possible that the phosphor layer be formed on the substrate simultaneously with synthesizing the phosphor from materials. The substrate may be cooled or heated, if needed, during the deposition process, or may be subjected to heat treatment (annealing treatment) after the deposition process is complete.

The vapor-accumulation method used in the invention is not restricted to the electron beam-evaporating method, and various other methods such as resistance-heating method and sputtering method can be used.

In the above-described manner, the phosphor layer in which the prismatic stimulable phosphor crystals are aligned almost perpendicularly to the substrate (support). Thus formed phosphor layer comprises only the stimulable phosphor with no binder, and there are cracks extending the depth direction in the phosphor layer.

FIG. 1 indicates relationships between relative density values of CsBr:Eu stimulable phosphor layers which have different thickness and are produced by vapor-accumulation and sensitivity values provided by the radiation image storage panels having the phosphor layer. These relationships have been discovered by the inventor.

Figure 2:
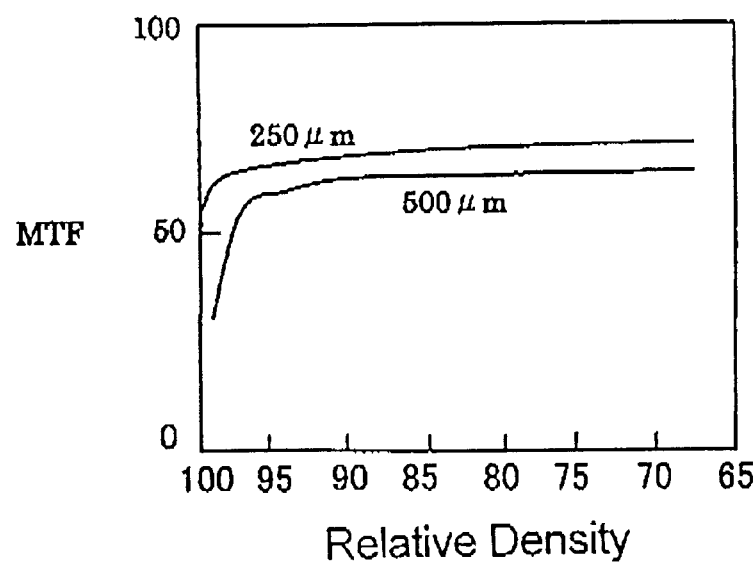
FIG. 2 indicates relationships between relative density values of phosphor layers produced by vapor-accumulation and sharpness values (MTF, 1 c/mm) provided by the radiation image storage panels having the phosphor layer.

FIG. 2 indicates relationships between relative density values of CsBr:Eu stimulable phosphor layers which have different thickness and are produced by vapor-accumulation and sharpness values (MTF, 1 c/mm) provided by the radiation image storage panels having the phosphor layer. These relationships have been discovered by the inventor.

FIG. 1 teaches that the sensitivity of the radiation image storage panel increases, as the thickness of the phosphor layer increases and as the relative density value of the phosphor layer increases. FIG. 2 teaches that MTF value sharply decreases when the relative density value is close to 100%, and MTF value does not so decrease, when the thickness of the phosphor layer increases.

From the data shown in FIG. 1 and FIG. 2, the specifically preferred ranges of the phosphor layer thickness and the relative density of the phosphor, that is, a thickness in the range of 300 to 700 $\mu$m, preferably 400 to 600 $\mu$m, and a relative density in the rage of 85 to 97%, preferably 85 to 95%, are determined.

The phosphor layer (or film) can be once accumulated on a temporary support such as a separately prepared glass plate, metal plate, or plastic plate, and then transferred and fixed onto a genuine support. Fixation may be performed using an adhesive.

It is preferred to provide a protective film an the surface of phosphor layer, so as to ensure good handling of the radiation image storage panel in transportation and to avoid deterioration. The protective film is preferably transparent. Further, for protecting the storage panel from chemical deterioration and physical damage, the protective film must be chemically stable, of high moisture proof, and physically strong.

The protective film can be provided by coating the stimulable phosphor layer with a solution in which a transparent organic polymer (e.g., cellulose derivatives, polymethyl methacrylate, fluororesins soluble in organic solvents) is dissolved in a solvent, by placing a before-hand prepared sheet for the protective film (e.g., a film of organic polymer such as polyethylene terephthalate, a transparent glass plate) on the phosphor layer with an adhesive, or by depositing vapor of inorganic compounds on the phosphor layer.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 $\mu$m (if the film is made of polymer material) or in the range of about 100 to 1,000 $\mu$m (if the film is made of inorganic material such as glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 $\mu$m. For forming the fluororesin layer, additives such as a crosslinking agent, a film-hardening agent and an anti-yellowing agent can be used. In particular, the crosslinking agent is advantageously employed to improve durability of the fluororesin layer.

Thus, the radiation image storage panel of the invention can be prepared. The storage panel of the invention may have known various structures. For example, in order to improve the sharpness of the resultant image, at least one of the layers may be colored with a colorant which does not absorb the stimulated emission but the stimulating rays.

EXAMPLE 1

(1) Preparation of Vapor Source

In a mortar, 100 g of cesium bromide (CsBr, 0.47 mol) and 1.8404 g of europium bromide (EuBr$_3$, 4.7×10$^{31}$ $^3$ mol) were pulverized and mixed. The mixture was further stirred and mixed for 15 minutes by a stir shaker, and placed in a furnace. The furnace was evacuated for 3 minutes, and then the mixture was fired at 525° C. for 2 hours under nitrogen gas atmosphere. After the firing was complete, the furnace was evacuated for 15 minutes to cool the product. Thus prepared europium activated cesium bromide (CsBr:0.01Eu) was pulverized in a mortar, and compressed at 800 kg/cm$^2$ to form a pellet (vapor source). The pellet was degassed at 150° C. for 2 hours.

(2) Formation of Phosphor Layer

The vapor source was placed at a predetermined position in a vapor-deposition apparatus, and a transparent quartz plate (substrate, thickness: 1 mm) was set at another predetermined position so that it might be perpendicular to the direction in which the vapor comes out of the source (distance: 14 cm). After the apparatus was evacuated to 5.0×10$^{-5}$ kg/cm$^2$, an electron beam from an electron gun (accelerating voltage: 4.0 kV, 60 W) was applied onto the vapor source so as to deposit the stimulable phosphor on the quartz substrate at a rate of 25 $\mu$m/min. After the inner pressure was returned to atmospheric pressure, the substrate was taken out of the apparatus. On thus-treated support, a deposited layer (thickness: 500 $\mu$m) consisting of prismatic phosphor crystals (each crystal having the width of approx. 10 $\mu$m and the length of approx. 500 $\mu$m) aligned thickly and perpendicularly was formed. The deposited phosphor layer had a relative density of 95%.

EXAMPLES 2 AND 3

The procedures for the preparation of the radiation image storage panel of Example 1 were repeated except for changing the substrate temperature and deposition rate into the values set forth in Table 1, to prepare radiation image storage panels according to the invention.

Comparison Examples 1 to 3

The procures for the preparation of the radiation image storage panel of Example 1 were repeated except for changing the substrate temperature, deposition rate, and thickness, into the values set forth in Table 1, to prepare radiation image storage panels for comparison.

Examination of Radiation Image Storage Panel (1) Sensitivity

Each of the radiation image storage panels of Examples 1 to 3 and Comparison Examples 1 to 3 was exposed to X-rays of 80 kVp (dose: 10 mR) and scanned with He—Ne laser beam. The stimulated emission was then detected to examine the sensitivity from the luminance of stimulated emission.

(2) Sharpness (MTF)

Each radiation image storage panel was exposed to the above-identified X-rays of 80 kVp (dose: 10 mR) through a CTF chart and scanned with He—Ne laser beam to produce image data. The image data were processed in an image reproducing apparatus to give image film. The image film was processed to determine a Modulation Transfer Function (MTF) at a space frequency of 1 c/mm.

The results are set forth in Table 1.

TABLE 1

| | Conditions deposition rate substrate temp. | Phosphor layer thickness relative density | Characteristics Sensitivity* MTF(1 c/mm) |
|---|---|---|---|
| Example 1 (CsBr:Eu) | 25 μm 250° C. | 500 μm 95% | 99 60% |
| Example 2 (CsBr:Eu) | 25 μm 200° C. | 500 μm 90% | 93 65% |
| Example 3 (CsBr:Eu) | 50 μm 150° C. | 500 μm 85% | 85 66% |
| Comp. Ex 1 (CsBr:Eu) | 25 μm 250° C. | 250 μm 95% | 60 70% |
| Comp. Ex 2 (CsBr:Eu) | 75 μm 50° C. | 500 μm 70% | 65 70% |
| Comp. Ex 3 (CsBr:Eu) | 5 μm 250° C. | 500 μm 99% | 99 30% |

Remarks: Sensitivity* is expressed by relative value. The radiation image storage panels of the invention (Examples 1 to 3) give a reproduced radiation image having well balanced sensitivity and sharpness, as compared with the radiation image storage panels for comparison (Comparison Examples 1 to 3). This means that the radiation image storage panel of the invention is specifically appropriate for clinical diagnosis.

What is claimed:

1. A radiation image storage panel comprising a phosphor film which has cracks extending in a depth direction thereof and is for by vapor-accumulating method, wherein the phosphor film has a thickness in the range of 300 to 700 μm and has a relative density in the range of 85 to 97%.

2. The radiation image storage panel of claim 1, wherein the phosphor film has a thickness in the range of 400 to 600 μm and has a relative density in the range of 85 to 95%.

3. The radiation image storage panel of claim 1, wherein the phosphor film comprises a stimulable alkali metal halide phosphor.

4. The radiation image storage panel of claim 3, wherein the stimulable alkali metal halide phosphor is a cesium halide phosphor.

* * * * *